United States Patent [19]

Giebeler

[11] Patent Number: 4,565,213

[45] Date of Patent: * Jan. 21, 1986

[54] BALL VALVE DEVICE WITH HOLD-OPEN TUBE

[75] Inventor: Bernhardt F. Giebeler, San Bernardino, Calif.

[73] Assignee: Bernhardt & Frederick Co., Inc., San Bernardino, Calif.

[ * ] Notice: The portion of the term of this patent subsequent to Apr. 21, 1998 has been disclaimed.

[21] Appl. No.: 426,936

[22] Filed: Sep. 29, 1982

Related U.S. Application Data

[63] Continuation-in-part of Ser. No. 201,426, Oct. 28, 1980, Pat. No. 4,377,179.

[51] Int. Cl.⁴ .......................................... F16K 31/122
[52] U.S. Cl. ................................... 137/494; 166/323
[58] Field of Search ................. 137/494; 166/322, 323

[56] References Cited

U.S. PATENT DOCUMENTS

| | | | | |
|---|---|---|---|---|
| 3,200,837 | 8/1965 | Brown | | 166/323 |
| 3,763,933 | 10/1973 | Mott | | 166/322 |
| 4,154,303 | 5/1979 | Fournier | | 166/323 |
| 4,262,693 | 4/1981 | Giebeler | | 137/494 |
| 4,287,954 | 9/1981 | Krause et al. | | 166/322 |

Primary Examiner—Alan Cohan
Assistant Examiner—John A. Rivell
Attorney, Agent, or Firm—Lyon & Lyon

[57] ABSTRACT

A ball valve is turned relative to its seat by means of three concentric sleeves mounted within a housing bore. Pins carried by the middle piston sleeve extend outward into slots in an outer carrier sleeve and inward into cam grooves in the outer wall of an inner drive sleeve. Axial movement of the middle sleeve under hydraulic pressure causes turning movement of the inner sleeve which then drives through bevel gears to turn the ball valve. The parts are constructed so that hydraulic forces within the housing acting to hold the ball valve in closed position against its seat are substantially balanced by forces in the opposite direction acting against the outer sleeve. A hold-open tube may be passed through the opening in the ball valve, to come to rest upon a choke sleeve.

3 Claims, 6 Drawing Figures

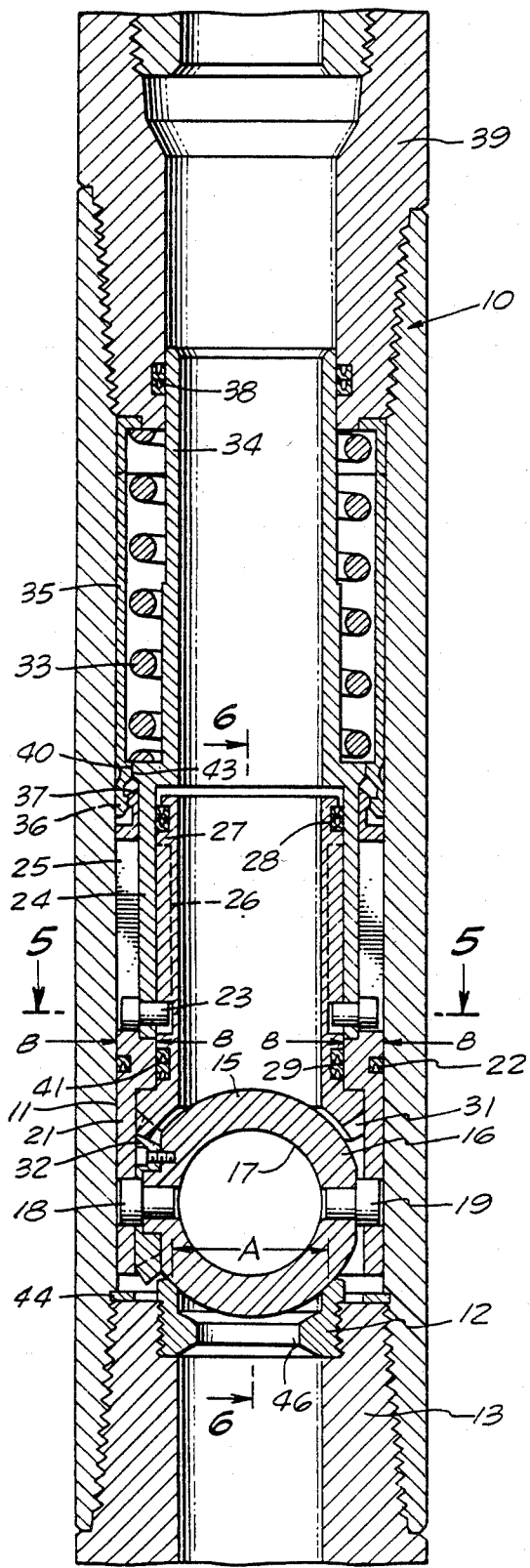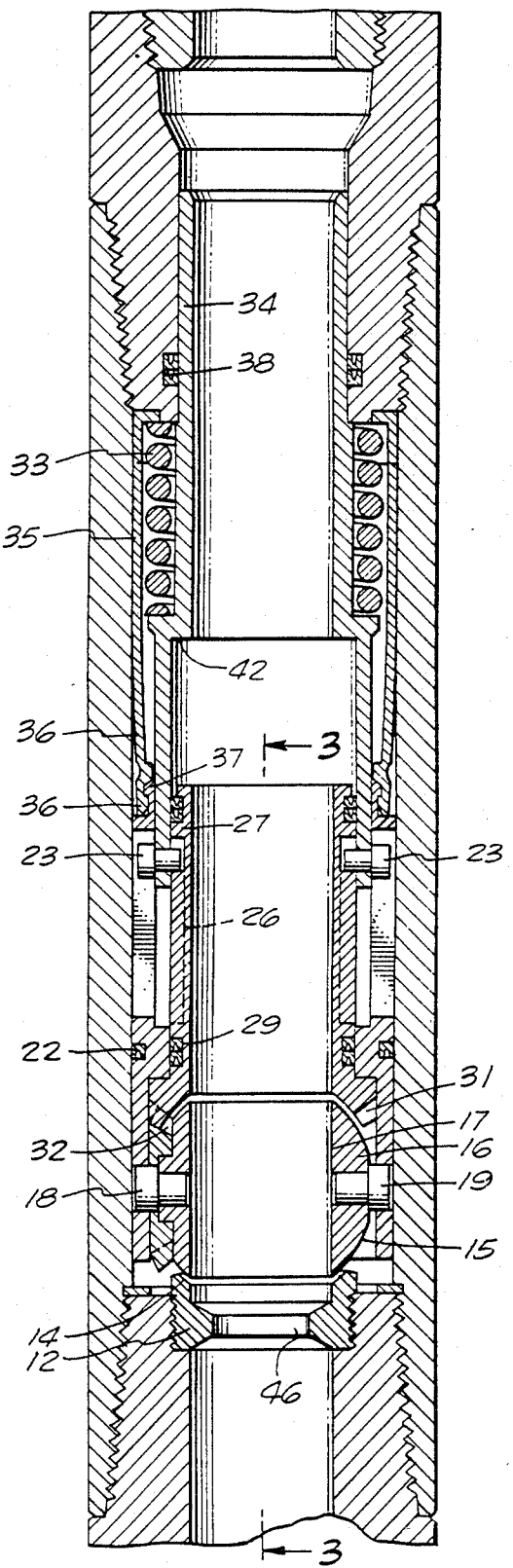

BALL VALVE DEVICE WITH HOLD-OPEN TUBE

This case is a continuation-in-part of my co-pending application Ser. No. 201,426 filed Oct. 28, 1980, now U.S. Pat. No. 4,377,179 and entitled "Pressure Balanced Ball Valve Device".

This invention relates to ball valve devices and is particularly directed to a ball valve device which is pressure balanced so that it can be caused to move between open and closed position without generating substantial frictional forces between the ball valve and its stationary seat. This invention constitutes an improvement over the device shown in my copending application Ser. No. 53,854 filed July 2, 1979 and entitled "Kelly Valve", now U.S. Pat. No. 4,262,693. The ball valve device of this invention may be used in a well-drilling environment, but this is by way of illustration and not of limitation. The device of this invention is useful for general application wherever ball valve devices are employed.

In accordance with this invention three concentric sleeves are mounted within a housing bore, the outer sleeve carrying diametrically opposed trunnions having a common transverse axis. A ball valve having a central opening is mounted to turn about this transverse axis. The turning movement is accomplished by a bevel gear fixed to the ball valve and meshing with a bevel gear fixed to the innermost sleeve. The middle sleeve positioned between the outer sleeve and the innermost sleeve carries pins which project radially outward into slots in the outer sleeve and project radially inward into inclined or helical grooves formed in the outer surface of the innermost sleeve. Hydraulic pressure causes axial movement of the middle sleeve and the cooperation of the pins, slots and grooves cause the innermost sleeve to turn. This action is carried through the bevel gears to cause the ball valve to turn.

An important feature of this invention is that the effective circular cross-section area of the ball valve closed against its seat is substantially equal to the annular cross-section area of the outer sleeve measured between the housing bore and the inner surface of the outer sleeve, so that hydraulic forces within the housing acting to hold the ball valve in closed position against its seat are substantially balanced by forces in the opposite direction acting against the outer sleeve.

A latching device is provided to insure that when the ball valve is being closed, it is rotated to its fully closed orientation before it is brought into contact with the stationary seat.

Other and more detailed objects and advantages will appear hereinafter.

In the drawings:

FIG. 1 is a longitudinal cross section showing a preferred embodiment of this invention, the ball valve being shown in closed position.

FIG. 2 is a sectional view similar to FIG. 1 showing the ball valve in open position.

Figure 3:
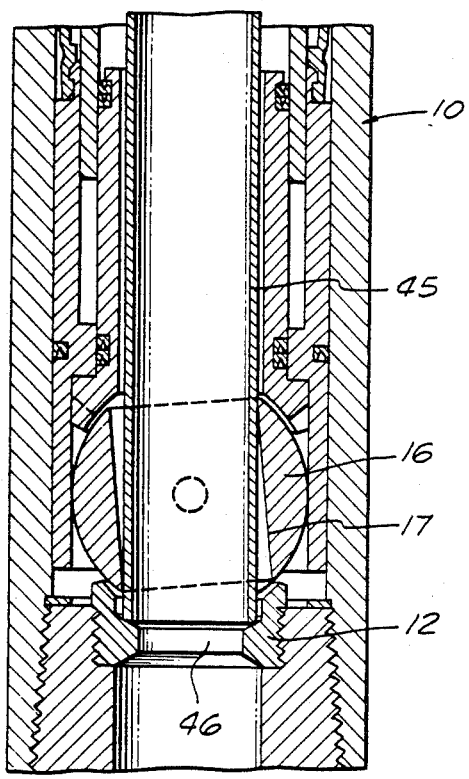
FIG. 3 is a sectional view taken substantially on the lines 3—3 as shown on FIG. 2, and showing a hold-open tube extending through the central opening in the ball valve, to rest upon a choke ring.

Referring to the drawings, the tubular housing generally designated 10 has an internal axial bore 11. An annular seat 12 is fixed to the housing 10 by means of the coupling member 13. The seating surface 14 is shaped for contact with the outer spherical surface 15 of the ball valve 16, which has a central cylindrical opening 17. The ball valve 16 turns on diametrically opposed trunnions 18 and 19 having a common transverse axis. The trunnions are fixed within a carrier sleeve 21 slidably mounted for limited axial movement within the housing bore 11. A seal ring 22 provides sealing contact.

Drive pins 23 are fixed to the piston sleeve 24 near its lower end, and these pins 23 extend radially outward into slots 25 provided in the carrier sleeve 21, and also extend radially inward into cam grooves 26 provided in the outer surface of the drive sleeve 27. The drive sleeve 27 is slidably mounted within the piston sleeve 24. Seal rings 28 and 29 provide sealing contact. The lower end of the drive sleeve 27 is formed as a bevel gear 31 which meshes with another bevel gear 32 fixed to the ball valve 16 and encircling the trunnion 18. From this description it will be understood that turning movement of the drive sleeve 27 serves to rotate the ball valve from the closed position shown in FIG. 1 to the open position shown in FIG. 2.

Figure 6:
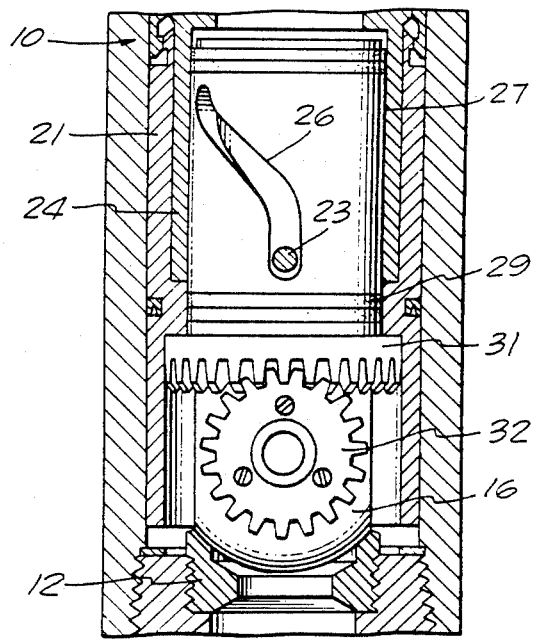
FIG. 6 is a sectional elevation taken substantially on the lines 6—6 as shown on FIG. 1.

The turning movement of the drive sleeve 27 occurs when the piston sleeve 24 is lifted hydraulically against the action of the compression spring 33. In the embodiment of the invention shown in the drawings, the slots 25 are straight and parallel to the longitudinal axis of the housing 10, while the cam grooves 26 are inclined or helical, as best shown in FIG. 6. It will be understood that, if desired, the slots 25 could be made helical and the grooves 26 made straight and axial, or both the slots 25 and grooves 26 could be inclined; the only requirement is that axial movement of the piston sleeve 24 carrying the pins 23 result in relative turning movement of the carrier sleeve 21 and piston sleeve 24, thereby causing the gears 31, 32 to rotate the ball valve 16.

The spring 33 is confined in an annular space between the upper portion 34 of the piston sleeve 24 and the spring cage 35 fixed within the bore 11 of the housing 10. The lower portion of the spring cage 35 is formed as a plurality of separate latch fingers 36 which engage cooperating latch elements 37 provided on the upper end of the carrier sleeve 21. The upper portion 34 of the piston sleeve 24 slides within the seal rings 38 carried in the coupling 39.

The effective circular cross-section area of the ball valve 16 closed against the seat 12 is designated "A" as shown in FIG. 1. The effective annular cross-section area of the carrier sleeve 21 between the housing bore 11 and the inner wall 41 is shown at "B—B" in FIG. 1. In accordance with this invention, the circular area "A" is substantially equal to the annular area "B—B". Accordingly, an increase in hydraulic pressure within the housing 10 and above the ball valve 16 does not increase the load on the seat 12, because the downward force on the circular area "A" is substantially balanced by the upward force on the annular area "B—B". Increasing hydraulic pressure above the ball valve 16 does, however, act to compress the spring 33 because the effective area of the shoulder 42 is greater than the effective area of the upper end 34 of the piston sleeve 24. As the hydraulic pressure increases to compress the spring 33, the piston sleeve 24 is lifted relative to the carrier sleeve 21 and the drive sleeve 27, with the result that the gears 31 and 32 turn the ball valve 16 from the closed position shown in FIG. 1 to the open position as shown in FIG. 2. Balancing of the forces across across the ball valve 16 causes it to lose pressure contact with the seat 12 so that it turns easily, losing the effect of area "A". As the ball valve 16 turns, its cylindrical opening 17 moves toward alignment with the central axial bore through the tool. The resulting unbalance causes quick lifting and turning movement of the ball valve. Some pulling force is transmitted to the floating ball valve 16 and the carrier sleeve 21 from the pins 23 in the cam slot 26 as the piston sleeve 24 causes the drive sleeve 27 to turn.

When it is desired to turn the ball valve 16 from open position to closed position, the hydraulic pressure above the ball valve is reduced to permit the spring 33 to expand and thereby cause relative turning movement between the carrier sleeve 21 and the drive sleeve 27.

At the time of initial assembly of the parts into the housing 10, the latch fingers 36 are in the position shown in FIG. 1, out of engagement with the latch elements 37 on the carrier sleeve 21. However, upon upward axial movement of the carrier sleeve 21, and after the ball valve 16 has turned and lost seal area "A" by increase in hydraulic pressure, the latch fingers 36 engage the latch elements 37 as shown in FIG. 2 of the drawings. When the hydraulic pressure drops within the housing 10, the piston sleeve 24 turns the ball valve 16 to fully closed position before the latch parts 36, 37 release, by engagement of the parts 40 and 43. The entire assembly of internal parts is held in place against disassembly by means of the split keeper ring 44.

Although the parts have been described as having an orientation in which the ball valve 16 is above the stationary seat 12, this is done only for ease of explanation. The parts operate satisfactorily in any position, upright, inclined, horizontal, or upside down.

FIG. 3 shows an extermally smooth cylindrical hold-open tube 45 extending through the central axial opening 17 in the ball valve 16 and resting on a choke ring 46 provided in the seat member 12. When the apparatus is used in a well-drilling environment, the hold-open tube 45 may be dropped from the surface through the interior 17 of the ball valve 16 to prevent unwanted closing of the ball valve 16. Well tools, not shown, may then be lowered and raised through the interior of the hold-open tube 45. In the absence of the hold-open tube 45, the choke ring 46 performs the function of providing back pressure to operate the ball valve 16 when the pipe string including the parts 39, 10 and 13 is lowered into the well and pressure is supplied from above to open the ball valve.

Figure 4:
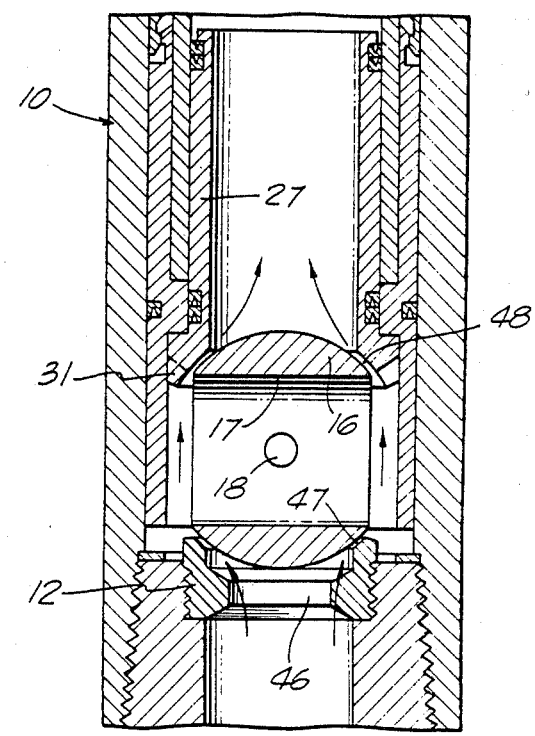
FIG. 4 is a view similar to FIG. 3 but showing the ball valve in position to accommodate reverse flow.
Figure 5:
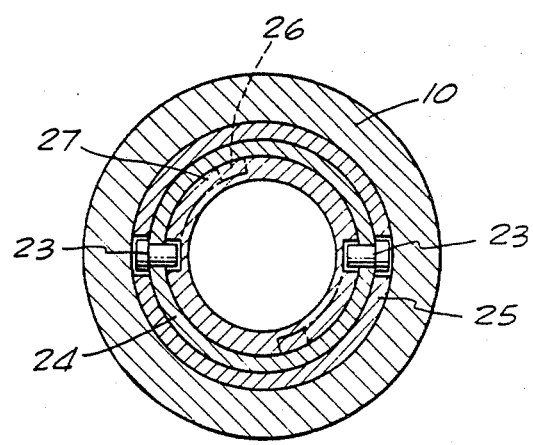
FIG. 5 is a transverse sectional view taken substantially on the lines 5—5 as shown on FIG. 1.

The arrows in FIG. 4 show the direction of upward flow past the ball valve 16 when it is in closed position but when the pressure below the ball valve exceeds the pressure above it. The reverse flow shown by the arrows takes place through the clearance spaces 47 and 48 which are sufficiently wide to permit fibrous or other material contained in drilling fluid to pass around the ball valve 16 with the flow, rather than plugging clearance spaces to restrict return flow.

Having fully described my invention, it is to be understood that I am not to be limited to the details herein set forth but that my invention is of the full scope of the appended claims.

I claim:

1. A ball valve device comprising, in combination: a stationary tubular housing having an axial bore, a stationary seat member secured to the housing and having a seating surface at the upper end of an axial passage, a ball valve having a central opening, means mounting said ball valve in the housing to turn between an open position in which its central opening is aligned with said housing bore and with the passage in the seat, and a closed position in which said ball valve closes against said seating surface, means for turning said ball valve between open position and closed position, a hold-open tube having a cylindrical outer surface without external projections, said hold-open tube being movable by gravity into said housing and through the central opening in the ball valve to maintain said ball valve in open position, and an abutment below said ball valve on which said hold-open tube comes to rest.

2. The combination set forth in claim 1 in which said abutment comprises a choke ring on the seat member projecting into said axial passage.

3. The combination set forth in claim 1 in which said abutment comprises a choke ring on the seat member projecting into said axial passage, said choke ring having less internal passage area than said central opening in said ball valve.

* * * * *